United States Patent [19]
Gano et al.

[11] Patent Number: 5,507,346
[45] Date of Patent: Apr. 16, 1996

[54] COMPOSITE WELL FLOW CONDUCTOR

[75] Inventors: John C. Gano, Carrollton, Tex.; Donald D. Baldwin; John A. Reigle, both of Lincoln, Nebr.

[73] Assignee: Halliburton Company, Houston, Tex.

[21] Appl. No.: 380,771

[22] Filed: Jan. 30, 1995

Related U.S. Application Data

[63] Continuation-in-part of Ser. No. 296,941, Aug. 26, 1994.
[51] Int. Cl.$^6$ .................................................. E21B 17/10
[52] U.S. Cl. ........................................ 166/285; 166/242.1
[58] Field of Search ...................................... 166/50, 117.5, 166/173, 242.1, 285

[56] References Cited

U.S. PATENT DOCUMENTS

| | | | |
|---|---|---|---|
| 3,205,945 | 9/1965 | Holt . | |
| 3,255,819 | 6/1966 | Scott et al. . | |
| 3,351,136 | 11/1967 | Nelson | 166/173 |
| 3,982,590 | 9/1976 | Harriman | 166/285 X |
| 4,402,551 | 9/1983 | Wood | 299/5 |
| 4,415,205 | 11/1983 | Rehm | 299/5 |
| 4,493,372 | 1/1985 | Radd et al. | 166/285 |
| 4,495,997 | 1/1985 | Scott et al. | 166/285 |

*Primary Examiner*—Roger J. Schoeppel
*Attorney, Agent, or Firm*—William M. Imwalle; David H. Hitt

[57] ABSTRACT

A well flow conductor and method of manufacture therefor. The well flow conductor includes: (1) a composite liner tube composed of a plurality of overlapping, resin-bonded composite plies and adapted to conduct a fluid flow therethrough and (2) a composite outer structure surrounding the composite liner tube and composed of a plurality of overlapping, resin-bonded composite plies arranged in a plurality of opposed helices about a centerline of the composite liner tube, the opposed helices intersecting at predetermined axial and radial locations on an outer surface of the composite liner tube to form nodes extending radially outwardly from the outer surface to form standoffs therefrom, the standoffs capable of centralizing the well flow conductor within an interior of a casing having a larger radius than that of the well flow conductor.

21 Claims, 1 Drawing Sheet

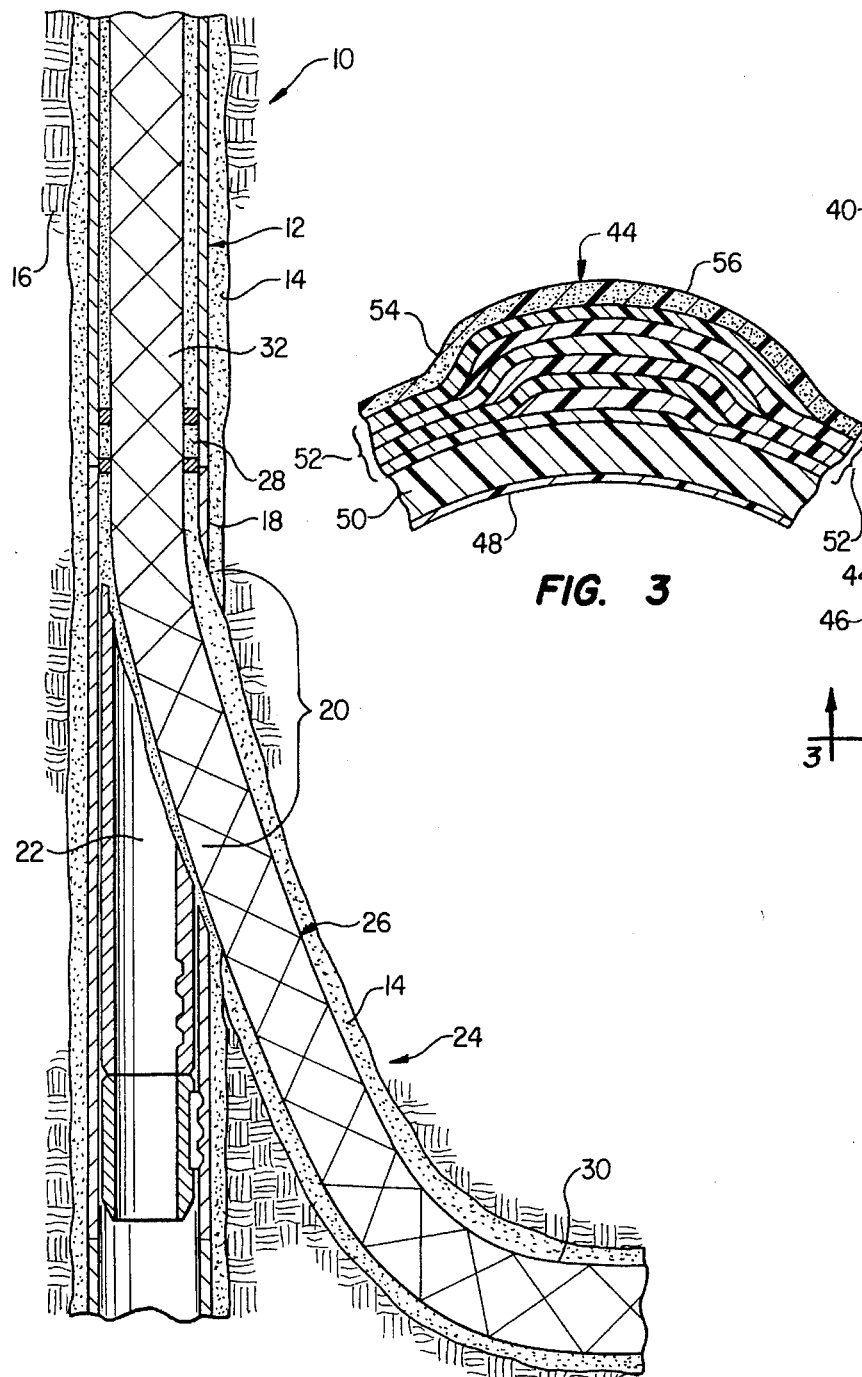
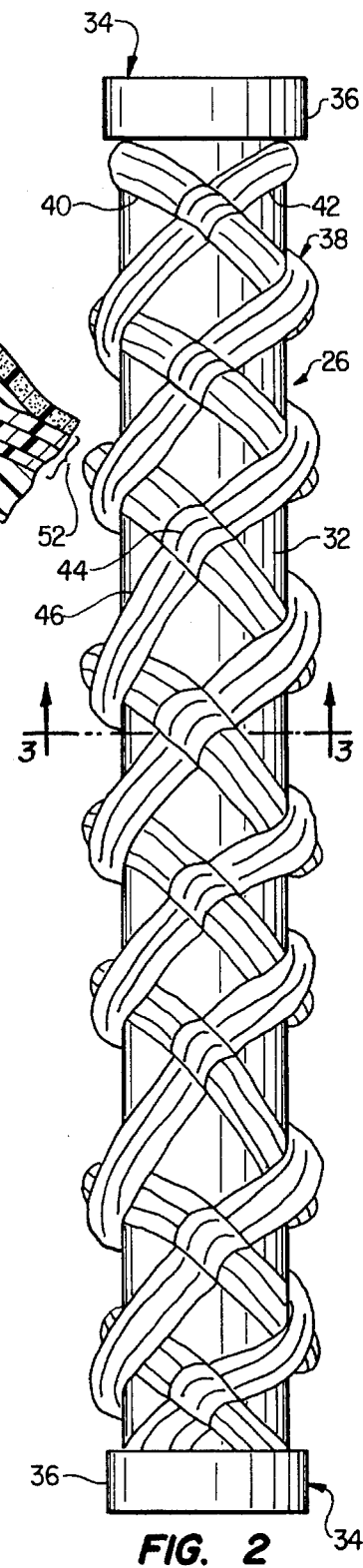
FIG. 1
FIG. 3
FIG. 2

COMPOSITE WELL FLOW CONDUCTOR

CROSS-REFERENCE TO RELATED APPLICATION

This is a continuation-in-part of Ser. No. 08/296,941, filed on Aug. 26, 1994, entitled "Improved Methods and Systems for Subterranean Multilateral Well Drilling and Completion," commonly assigned with the present invention and incorporated herein by reference.

TECHNICAL FIELD OF THE INVENTION

The present invention is directed, in general, to a composite structures and more specifically to a composite well flow conductor for drilling and completing subterranean multilateral wells and a method of manufacture therefor, the wells providing connectivity among main and lateral wellbores, pressure-bearing sealing of joints for selective isolation of wellbores or portions thereof and subsequent wellbore access for rework or other purposes.

BACKGROUND OF THE INVENTION

Horizontal well drilling and production have become increasingly important to the oil industry in recent years. While horizontal wells have been known for many years, only relatively recently have such wells been determined to be a cost-effective alternative to conventional vertical well drilling. Although drilling a horizontal well costs substantially more than its vertical counterpart, a horizontal well frequently improves production by a factor of five, ten or even twenty in naturally-fractured reservoirs. Generally, projected productivity from a horizontal wellbore must triple that of a vertical wellbore for horizontal drilling to be economical. This increased production minimizes the number of platforms, cutting investment and operational costs. Horizontal drilling makes reservoirs in urban areas, permafrost zones and deep offshore waters more accessible. Other applications for horizontal wellbores include periphery wells, thin reservoirs that would require too many vertical wellbores, and reservoirs with coning problems in which a horizontal wellbore could be optimally distanced from the fluid contact.

Also, some horizontal wellbores contain additional wellbores extending laterally from the primary vertical wellbores. These additional lateral wellbores are sometimes referred to as drainholes and vertical wellbores containing more than one lateral wellbore are referred to as multilateral wells. Multilateral wells are becoming increasingly important, both from the standpoint of new drilling operations and from the increasingly important standpoint of reworking existing wellbores, including remedial and stimulation work.

As a result of the foregoing increased dependence on and importance of horizontal wells, horizontal well completion, and particularly multilateral well completion, have been important concerns and continue to provide a host of difficult problems to overcome. Lateral completion, particularly at the juncture between the main and lateral wellbores, is extremely important to avoid collapse of the wellbore in unconsolidated or weakly consolidated formations. Thus, open hole completions are limited to competent rock formations; and, even then, open hole completions are inadequate since there is no control or ability to access (or reenter the lateral) or to isolate production zones within the wellbore. Coupled with this need to complete lateral wellbores is the growing desire to maintain the lateral wellbore size as close as possible to the size of the primary vertical wellbore for ease of drilling and completion.

The above concerns can be summarized in three main objectives: connectivity, isolation and access. Connectivity refers to the mechanical coupling of casings in the main and lateral wellbores such that there are no open holes between casings. This ensures that the multilateral completion is not subject to collapse of a section of open hole and that open hole tools are not required to access portions of the completion.

Isolation refers to the ability to seal off one or more wellbores, or any selectable portion thereof, without impeding production from remaining wellbores or portions. To isolate one wellbore from another effectively, the casings in the wellbores must be hydraulically sealed (generally up to 5000 psi) to one another to allow the multilateral completion as a whole to withstand hydraulic pressure. Hydraulic sealing is particularly important at the juncture between main and lateral wellbores. Without hydraulic sealing, either pressure is lost into the void that surrounds the casing or fluid or particulate contaminates are allowed to enter the casing from the surrounding void. While connectivity, isolation and access are important in both horizontal and vertical wells, they are particularly important and pose particularly difficult problems in multilateral well completions. As mentioned above, isolating one lateral wellbore from other lateral wellbores is necessary to prevent migration of fluids and to comply with completion practices and regulations regarding the separate production of different production zones. Zonal (or partial wellbore) isolation may also be needed if the wellbore drifts in and out of the target reservoir because of insufficient geological knowledge or poor directional control. When horizontal wellbores are drilled in naturally-fractured reservoirs, zonal isolation is seen as desirable. Initial pressure in naturally-fractured formations may vary from one fracture to the next, as may the hydrocarbon gravity and likelihood of coning. Allowing the formations to produce together permits crossflow between fractures. A single fracture with early water breakthrough may jeopardize the entire well's production.

Access refers to the ability to reenter a selected one of the wellbores to perform completion work, additional drilling or remedial and stimulation work, preferably without requiring a full drilling rig. In the most preferable situation, any one of the lateral wellbores can be entered using coiled tubing, thereby saving money.

There have been several prior art techniques of completing multilateral wells using open-hole completion techniques. One involves the drilling of a single main wellbore and one or more lateral wellbores emanating from a base portion thereof. The main wellbore is cased except for the base portion. The base portion and the one or more lateral wellbores are left open-hole. Although this completion technique is relatively inexpensive, not one of the above three main objectives (connectivity, isolation and access) is satisfied, as there are portions of the wellbores left open-hole, the open-hole wellbores cannot be selectively sealed off, except to a limited degree with open-hole isolation tools and access to the lateral wellbores can only be by way of bent subs or orientation devices. Apart from the three main objectives, if one of the lateral wellbores collapses or becomes clogged, the entire well is threatened.

Another prior art completion technique calls for the drilling of one or more open hole lateral wellbores from a main wellbore. A special casing having a number of inflatable open-hole packers and perforations between the inflatable packers is placed in the main wellbore. The inflatable packers serve to separate the lateral wellbores hydraulically from one another. This technique therefore offers a degree of isolation, in that an entire lateral can be sealed off from the rest. However, portions of a lateral cannot be sealed off. Further, there is neither connectivity nor access. Finally, the lateral wellbores are left open-hole. Therefore, if a lateral wellbore collapses or becomes clogged, production from that wellbore is compromised.

Conventionally, some multilateral completion techniques have employed slotted liner completion. The primary purpose of inserting a slotted liner in a lateral wellbores is to guard against hole collapse. Additionally, a liner provides a convenient path to insert various tools such as coiled tubing in the wellbore. Three types of liners have been used, namely: (1) perforated liners, where holes are drilled in the liner, (2) slotted liners, where slots of various width and length are milled along the line length, and (3) prepacked screens.

One prior art completion technique employing liners is similar to the first-described open-hole completion technique, but requires the lateral wellbores to be fitted with liners. However, the liners terminate within the lateral wellbores, resulting in short lateral wellbore sections proximate the main wellbore that are left open-hole. Similarly, the base portion of the main wellbore is left open-hole. Although not as inexpensive as the first-described open-hole technique, this completion technique is still relatively inexpensive. However, none of the above three main objectives is satisfied, as portions of each lateral wellbore and the base portion of the main wellbore are left open-hole. The open-hole wellbores cannot be selectively sealed off, except to a limited degree with open-hole isolation tools. Finally, access to the lateral wellbores can only be by way of bent subs or orientation devices. The sole advantage of this completion technique is that liners provide support as against erosion or collapse in the lateral wellbores.

A second completion technique employing lined laterals involves two lateral wellbores extending from a main wellbore, one over the other, each having a liner and each liner extending back to a casing in the main wellbore. Thus, connectivity is achieved, as the liners are hydraulically sealed to the main wellbore casing. Unfortunately, the lower of the two lateral wellbores cannot be sealed off (isolated). Further, the lower of the two lateral wellbores cannot be accessed subsequently. Thus, only one of the three principal objectives is met.

A third completion technique employing lined laterals is reserved for new well completion and involves the drilling of multiple lateral wellbores from a main wellbore. A liner is inserted into the main wellbore. The liner is provided with windows therein corresponding to the position of the laterals. Thus, the main wellbore liner must be oriented when it is inserted. Next, liners are inserted into the lateral wellbores. The open ends of the lateral wellbore liners extend through the windows of the main wellbore liner. This technique is designed for new wells, because the location and orientation of the lateral wellbores must be prearranged. Applying the three main objectives, connectivity is not present, since the lateral wellbore liners are not sealed to the main wellbore liner. Isolation is possible, but access to the lateral wellbores for the purpose of reworking or isolating a lateral wellbore must be made by way of bent subs or orientation devices.

One further prior art completion technique does not involve either open-hole or lined lateral wellbores. This technique requires the drilling of a relatively large main wellbore. Multiple lateral wellbores are drilled in parallel through the bottom of the main wellbore and spread in separate directions. The main and lateral wellbores are cased and sealed together. All three of the three main objectives are met, as isolation of and access to each lateral wellbore are provided. However, in most cases, only two or three lateral wellbores are allowed, as the cross-sectional areas of the lateral wellbores must fit within the cross-sectional area of the main wellbore. This severely limits the cost effectiveness of the well as a whole, as the main wellbore must be of exceptionally large diameter and thus relatively expensive to drill.

The problem of lateral wellbore (and particularly multi-lateral wellbore) completion has been recognized for many years as reflected in the patent literature, For example, U.S. Pat. No. 4,807,704 discloses a system for completing multiple lateral wellbores using a dual packer and a deflective guide member. U.S. Pat. No. 2,797,893 discloses a method for completing lateral wells using a flexible liner and deflecting tool. U.S. Pat. No. 2,397,070 similarly describes lateral wellbore completion using flexible casing together with a closure shield for closing off the lateral. In U.S. Pat. No. 2,858,107, a removable whipstock assembly provides a means for locating (e.g., accessing) a lateral subsequent to completion thereof. U.S. Pat. No. 3,330,349 discloses a mandrel for guiding and completing multiple horizontal wells. U.S. Pat. Nos. 4,396,075; 4,415,205; 4,444,276 and 4,573,541 all relate generally to methods and devices for multilateral completions using a template or tube guide head. Other patents of general interest in the field of horizontal well completion include U.S. Pat. Nos. 2,452,920 and 4,402,551.

Ser. No. 08/296,941, initially referenced above, discloses several methods and systems for subterranean multilateral well drilling and completion. Of two main embodiments of such methods and systems, the latter, in a preferred embodiment, employs a drillable composite joint or liner that extends from the main borehole and through a window in the main borehole into the lateral borehole. In place, the liner blocks a lower portion of the main borehole. After being cemented into place, a portion of the liner must be removed, preferably by drilling through the portion with an ordinary rock bit, to reopen the lower portion of the main borehole.

However, simply providing a drillable composite tube as a liner has significant disadvantages. First, such liners must be cemented in place and thus must have an outer diameter substantially less than an inner diameter of the surrounding main casing to allow for the cement. However, given such room within the main casing, the liner tends to wander radially within the main casing, thereby causing the liner to decentralize. This is disadvantageous, because the cement may not be distributed about the liner evenly, thereby compromising the strength of the cement bond. The prior art has provided metallic spacers that may be fitted to the liner at periodic points about its length. However, the metallic spacers are not drillable by a conventional rock bit and therefore present an obstacle if a spacer happens to be at the portion of the liner that is to be removed. Furthermore, such metallic spacers are local and do not run the full length of the liner.

Second, as cement is introduced into the annular space between the outer diameter of the liner and the inner diameter of the main casing or lateral borehole, impurities or voids may also be introduced. Typically, the voids will be caused by well fluids that displace the cement or occur because the cement settles. This may be more pronounced in lateral or horizontal wellbore sections in which the heavier cement settles to the lower areas about the casing and formation fluids rise to the upper areas resulting in voids in the cement in the upper areas. Optimally, the impurities should be mixed throughout the cement to decrease their detrimental effects. The prior art has provided turbulence devices substantially comprising metallic fins that, like the spacers, may be fitted to the liner at periodic points about its length. However, the metallic fins are not drillable by a conventional rock bit and therefore also present an obstacle if a turbulence device happens to be at the portion of the liner that is to be removed. Furthermore, as with the metallic spacers, such turbulence devices are local and do not run the full length of the liner.

Thus, what is needed in the prior art is a composite joint or liner that is drillable by an ordinary rock bit, but that includes features directed to centralizing the liner within the main casing and to providing turbulence and mixing to the cement that is eventually to surround the liner.

SUMMARY OF THE INVENTION

To address the above-discussed deficiencies of the prior art, it is a primary object of the present invention to provide a composite joint or liner (or "well flow conductor," in the broadest sense) that includes a structure directed to centralizing the liner within the main casing and to providing turbulence and mixing to the cement that is eventually to surround the liner.

In the attainment of the above primary object, one aspect of the present invention provides a well flow conductor, comprising: (1) a composite liner tube composed of a plurality of overlapping, resin-bonded composite plies and adapted to conduct a fluid flow therethrough and (2) a composite outer structure surrounding the composite liner tube and composed of a plurality of overlapping, resin-bonded composite plies arranged in a plurality of opposed helices about a centerline of the composite liner tube, the opposed helices intersecting at predetermined axial and radial locations on an outer surface of the composite liner tube to form nodes extending radially outwardly from the outer surface to form standoffs therefrom, the standoffs capable of centralizing the well flow conductor within an interior of a casing having a larger radius than that of the well flow conductor.

Thus, the present invention introduces a helical wrap that surrounds the tubular conductor. The helical wrap centralizes the conductor without overly restricting the flow of cement around the conductor.

In a preferred embodiment of the present invention, the well flow conductor further comprises a sacrificial layer located on an inner surface of the well flow conductor and composed of a substantially fiber-free resin to isolate the nodes from direct contact with the well flow conductor as tools travelling within the well flow conductor contact the inner surface.

It is highly desirable to protect the fiber matrix constituting the conductor from contact with the tools that may repeatedly be brought through the conductor. As the tools move through the conductor, any erosion of the conductor is realized on the sacrificial layer, rather than on the matrix.

In a preferred embodiment of the present invention, the well flow conductor further comprises an abrasion-resisting material located on the nodes to resist wearing of the nodes as the well flow conductor contacts the casing.

It is recognized that the well flow conductor may come into substantial frictional contact with the inner surface of the main casing as it is lowered into place within the main casing. To preserve the radial dimension of the nodes and therefor their ability to centralize the conductor within the main casing, the abrasion-resisting material, possibly comprising ceramic beads or other tough materials, is deposited on or in the nodes. Therefore, in a more preferred embodiment of the present invention, the composite outer structure comprises ceramic beads.

In a preferred embodiment of the present invention, the composite outer structure comprises first and second left-hand helices and first and second right-hand helices. The terms "left-hand" and "right-hand" are known in the art to refer to counterclockwise and clockwise threads or bands, respectively. In this embodiment, there are two of each, intersecting at four radial locations about the conductor.

In a preferred embodiment of the present invention, the helices are oriented at a 45° angle with respect to the centerline of the composite liner tube. Those of skill in the art will recognize that the number of nodes may be increased or decreased by increasing or decreasing this angle, respectively.

In a preferred embodiment of the present invention, the composite plies are composed of a selected one of fiberglass and carbon fiber. Those of skill in the art will understand that the present invention is primarily directed to a composite structure. The composite structure may be constructed of any one or more than of many well known composite fiber/resin combinations to alter the physical characteristics of the conductor.

In a preferred embodiment of the present invention, the well flow conductor is adapted to be placed within the casing within a wellbore, an upper portion of the well flow conductor located within a main wellbore and a lower portion of the well flow conductor extending through a window in the casing and located within a lateral wellbore.

Thus, the present invention is advantageously adapted for use in the multilateral well environment. However, those of skill in the art will realize that other subterranean applications not involving multilateral wells are within the scope of the present invention.

In a preferred embodiment of the present invention, the well flow conductor is adapted to be cemented within the casing, the composite outer structure generating turbulence in cement flowing about the well flow conductor and providing a complex outer surface for enhanced bonding with the cement. The helices create two distinct effects on the outer surface of the well flow conductor. First, where the helices overlap, centralizing nodes are formed. Second, where the helices do not overlap, intermediate raised bands cause turbulence to fluids (cement) flowing over the outer surface of the composite liner tube. As previously mentioned, this turbulence (1) distributes any impurities throughout the cement, thereby decreasing their detrimental effects and (2) assures even distribution about the tube and displacement of wellbore fluids. Finally, the nodes and intermediate raised bands contribute to the overall surface area and complexity, enhancing the cement bonding both chemically and mechanically.

In a preferred embodiment of the present invention, the well flow conductor has a diameter of 8.25". Those of skill in the art will recognize that, while this diameter is advantageous in multilateral wells, the present invention is directed to diameters of all sizes.

In further attainment of the above primary object, another aspect of the present invention provides a method of manufacturing a well flow conductor, comprising the steps of: (1) overlapping a plurality of resin-bonded composite plies to form a composite liner tube, the composite liner tube adapted to conduct a fluid flow therethrough and (2) surrounding the composite liner tube with a composite outer structure, the composite outer structure composed of a plurality of overlapping, resin-bonded composite plies arranged in a plurality of opposed helices about a centerline of the composite liner tube, the opposed helices intersecting at predetermined axial and radial locations on an outer surface of the composite liner tube to form nodes extending radially outwardly from the outer surface to form standoffs therefrom, the standoffs capable of centralizing the well flow conductor within an interior of a casing having a larger radius than that of the well flow conductor. Thus, the present invention is also directed to a method of manufacturing such conductors.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a vertically foreshortened, highly schematic partial cross-sectional view of a cased main wellbore after the step of setting and cementing with a lateral wellbore having a liner of the present invention inserted therein and hung within the main wellbore;

FIG. 2 illustrates a perspective view of a section of the liner of the present invention showing the opposing crossed helical bands forming nodes on the outer perimeter of the liner at the point of their intersection; and FIG. 3 illustrates a partial cross-section taken along the line 3—3 through a node and showing the overlapping of the various layers comprising the helical bands and nodes.

DETAILED DESCRIPTION

Turning initially to FIG. 1, there is illustrated a vertically foreshortened, highly schematic, partial cross-sectional view of a main wellbore 10 with casing 12 that has been set and cemented in place with casing cement 14 squeezed between the exterior wall of the casing 12 and the various geological formations 16. The casing 12 has formed in its side wall 18 a casing window 20 with a diverter or whipstock 22 set immediately below the casing window 20 for directional operations. A lateral wellbore 24 having been drilled in a generally lateral direction from the main wellbore 10 as determined by the orientation of the diverter 22 is also illustrated. Received in the lateral wellbore 24 is a composite liner 26, which has also been cemented into place. A first portion 28 of the liner 26 extends and resides uphole within the casing 12 and a second portion 30 of the composite liner 26 extends a predetermined distance into the lateral wellbore 24. As schematically illustrated, the composite liner 26 is hung or secured in place within the main wellbore 10 and then set in place with cement 14. As described below, the unique outer surface structure 32 of the composite liner 26 provides for centralization of the composite liner 26 within the casing 12 and thorough mixing and bonding of the cement 14 between the casing 12 and the composite liner 26.

Turning now to FIG. 2, illustrated is a perspective view of a section or joint of the composite liner 26. The composite liner 26 is comprised of a drillable composite material, which allows the use of a conventional rock bit to drill through the composite liner 26 and reestablish access to distal portions of the main wellbore 10, if necessary. The composite liner 26 is preferably a generally cylindrical tube that is adapted to conduct a fluid flow therethrough and is composed of a plurality of overlapping composite plies, as described hereinbelow, that form the composite outer surface 32. The opposing ends 34 of the composite liner 26 preferably have threaded end fittings or collars 36 adhesively secured or mechanically pinned thereto for connection to conventional metallic casing or liners.

Formed on the outer surface 32 is the composite outer structure 38 that is comprised of a plurality of overlapping, composite band-like plies arranged in a plurality of opposed helices 40,42 about a centerline of the composite liner 26. As used herein, the phrase "opposed helices" means left and right helical patterns that intersect at points along the length of the composite liner 26 with the left helical pattern 40 spirally traversing a length of the composite liner 26 in a counter clockwise direction and the right helical pattern 42 spirally traversing a length of the composite liner 26 in a clockwise direction. Preferably, the opposed helices 40,42 run substantially the entire length of the composite liner 26 and intersect each other at predetermined axial and radial locations on the outer surface 32 of the composite liner 26 to form a gridwork helical pattern. The opposing helices 40,42 have nodes 44 and intermediate bands 46 extending between the nodes 44. The opposing helices 40,42 may be produced by conventional fiber winding processes associated with the fabrication of composite joints. More specifically, the opposing helices 40,42 are preferably formed by simultaneously applying conventional epoxy resins and winding bands of fiberglass cloth tape or filaments onto the outer surface of the composite liner 26. The opposing helices 40,42 are overlaid in alternating single repeating left helical band patterns 40 and single repeating right helical band patterns 42 with no substantial band advance on either the left or right helical patterns. The absence of substantial band advance causes a build up of the epoxied fiberglass filaments to form, in relief, the nodes 44 and the intermediate bands 46 on the outer surface 32 at the point of intersection of the opposing helices 40,42. The nodes 44 are built up to a height greater than that of the intermediate band patterns 46.

As a result of this unique opposing helical configuration, helical passageways are formed, between the casing 12 and the outer surface 32 of the composite liner 26. Preferably, the diameter of the composite liner 26, including the radial extension of the nodes 44, does not exceed approximately 8.3 inches in diameter and the band width of the opposing helices 40,42 preferably does not exceed about 1 inch.

The construction of the opposing helices 40,42 is simple and can be easily modified to provide unique and specific properties for centralization, flow, bonding and wear. For example, the number of opposing helices may be increased to provide greater turbulence, centralization effects and greater shear strength. In another instance, a high wear material, such as ceramic beads may be added to a layer covering the nodes 44 to increase wear resistance. Additionally, if desired, the patterns can be multiple, interspersed opposing helical patterns wrapped around the outer surface 32 of the composite liner 26 to provide more crossover or nodal intersection points.

The nodes 44 and the opposing helices 40,42 each perform important functions in the present invention. For example, the nodes 44 extend radially outwardly from the outer surface 32 to form high spots or standoffs therefrom that are capable of centralizing the composite liner 26 within an interior of the casing 12, which has a larger radius than that of the composite liner 26. The opposing helices 40,42 function as a tortuous path between the casing 12 and the composite liner 26. This tortuous path consequently creates and increases the turbulent effect on drilling fluids and slurries, such as drilling fluids and cement slurry mixtures to thoroughly mix such fluids and slurries as they are pumped between the casing 12 and the composite liner 26. This increase in flow turbulence also helps to better clean the hole prior to cementing and facilitates a more efficient displacement of the well fluids during the composite liner 26 cementing process. Further, the opposing helices 40,42 provide increased surface area for cement bonding and mechanical locking mechanism to provide even higher shear strength when the composite liner 26 is cemented.

Turning now to FIG. 3, there is illustrated a partial cross-sectional view of the composite liner 26 of the present invention showing the interior sacrificial layer 48, the liner plies 50 comprising the composite liner 26, the plies 52 comprising the outer structure 38 and the outer sacrificial layer 54, each of which will now be discussed in the order just mentioned.

As previously mentioned, the interior surface of the composite liner 26 may include an interior sacrificial layer 48. The interior sacrificial layer 48 is also comprised of a composite material, which is preferably an epoxy and fiberglass cloth material that provides protection from wear resulting from the contact of various tools on the interior surface that as they are inserted in or through the composite liner 26 during drilling, completion or work-over operations. The presence of this sacrificial layer is optional and may be omitted if desired.

The liner plies 50 that constitute the composite liner 26 are preferably comprised of resin-bonded composite plies wherein the preferred resin is an epoxy resin and the preferred composite material is conventional fiberglass cloth tape or filaments typically used in the fabrication of composite joints. The plies 50 are applied with a conventional fiber winding apparatus used in the fabrication of composite joints. It should be noted that while only one such pile is illustrated, the composite liner 26 is comprised of a plurality of overlapping, resin-bonded composite plies 50 that are overlaid to build up the composite liner 26 to the desired diameter.

The filaments in the plies 50 are preferably applied in alternating tension\torque and hoop stress layers to give the composite tube the required degree of tension, torque and hoop strength that are necessary for application in drilling, completion and work-over operations. Preferably, the tension\torque layer is applied at a relatively shallow angle, preferably of about 15°, with respect to the axis of the composite liner 26, and the hoop layer is applied at a steep angle, preferably of about 85°, with respect to the axis of the composite liner 26. Carbon fibers are preferably added to the epoxy which partially forms the hoop layer. The addition of the carbon gives the hoop layer the required degree of strength while allowing the composite liner 26 to be manufactured with a smaller outer diameter. When carbon or a similar strengthening material is not used, the composite liner 26 must have a larger diameter to achieve the same degree of hoop strength obtained from using the carbon. The carbon makes for a stiffer liner 26 an allows for greater collapse pressure resistance.

As discussed above, the nodes 44 and the intermediate bands 46 that form the opposing helices 40,42 are preferably comprised of overlapping resin-fiber material plies 52 in the form of bands, having a preferable width of about 1 inch after application. The resin and fibers used may vary as required by design, however, the resin and fibers are preferably the same type of epoxy resin and fiberglass cloth tape or filaments used to fabricate the liner 26. The plies 52 are overlapped in succession and build up at the point of helical intersection to form the nodes 44 and the intermediate band An outer sacrificial layer 54, which is preferably comprised of an epoxy resin, may be applied over the nodes 44 to offer additional wear resistance, and if more wear resistance is desired, additional wear resistance materials, such as ceramic beads 56 may be added to the epoxy resin coating.

With the composite liner 26 having been described, the method of manufacture with respect to the composite liner 26 will now be briefly discussed with reference to FIGS. 1–3. The tubular portion of the composite liner 26 is preferably formed using conventional techniques on a fiber winding apparatus used in the fabrication of conventional composite joints. The winding apparatus is typically includes a motor driven cylindrical winding mandrel horizontally oriented between to support members with the motor's speed being adjustable to achieve different winding speeds. The fiberglass cloth filaments are fed from "starts" or spools that continuously supply a band of the fiberglass cloth tape or filaments to the winding mandrel. An epoxy resin is applied to the band as the band is wound onto the mandrel. The angle of the band's contact with the winding mandrel and the amount of pull tension on the bands can be varied to achieve different types of strength parameters within the liner 26, such as tension/torque or hoop strength.

In a conventional manner, the band for the first ply is started at one end of the winding mandrel and advanced back and forth along the length of the mandrel as the mandrel is rapidly turned by the motor. This process is repeated until the desired thickness of that particular ply is achieved. The next and subsequent plies are applied in the same manner until the composite liner 26 reaches the desired diameter at the outer surface 32, approximately 7.5 inches.

The helical patterns are next formed on the outer surface 32 of the composite liner 26. A band of fiberglass, cloth tape or filament is started on the composite liner as the mandrel is rapidly turned and epoxy resin is applied to the band. A band width of 0.75 inches is used with the expectation that some spreading will occur to achieve a band width of about 1 inch. The wind angle of the band with respect to the longitudinal axis of the composite liner 26 is +/– 45°, which achieves a 2-loop helices on a composite liner 26 having a length of approximately 29 feet and a circumference of approximately 24 inches. The wind tension ranges from about 1½ to 2 lbs, which is kept at this low level to minimize band flattening. The band is advanced along the length of the composite liner 26 until it reaches the end, thereby forming a first helical pattern.

Another band is then advanced along the length of composite liner 26 using the same parameters as with the first helical with the exception that is wound in an opposite direction to form a second helical pattern that opposes the first. The opposite direction causes the second helical path to intersect the first helical path at regular intervals of approximately 5 inch spacings around the circumference of the composite liner 26. This process is then repeated by overlaying another band on the first helical pattern with no band advance with respect to the first helical pattern such that the second band substantially overlays the first band of the first helical pattern. A second band is laid over the first band of the second helical pattern with no band advance with respect to the second helical pattern such that the second band substantially overlays the first band of the second helical pattern. This alternating process with respect to the opposing helical patterns is repeated until the overall diameter of the composite liner 26 is built up to approximately 8.3 inches, which gives the nodes having a preferred thickness of approximately 0.4 inches and preferred perimeter dimensions of approximately 1 inch by 1.4 inches.

The composite liner 26 fabricated in the above manner offers a liner that is drillable and therefore reduces the number of trips into the main wellbore. In many multilateral well operations, it is desirable to drill out a portion of the liner that blocks the main wellbore and reestablish access to distal portions of the main wellbore. The liner in some cases is composed of steel, and in such instances, the drill string must be taken out of the main wellbore (i.e. tripped out) to change the conventional rock bit with a special milling bit that is capable of cutting through the steel liner. In contrast to conventional steel liners, the composite material from which the composite liner 26 is made provides a liner tube that is easily drillable with a conventional rock bit. Therefore unnecessary additional trips into the hole are for changing bits is unnecessary since the ease of drillablity of the composite liner 26 does not require that a special milling bit be employed to drill through the composite liner 26. In addition, the composite liner of the present invention also provides a liner with centralizing nodes formed on opposing helical patters that also provides a turbulent flow path for fluids circulated between the liner and the casing and adds substantial strength to the liner.

From the above, it is apparent that the present invention provides a well flow conductor, comprising: (1) a composite liner tube composed of a plurality of overlapping, resin-bonded composite plies and adapted to conduct a fluid flow therethrough and (2) a composite outer structure surrounding the composite liner tube and composed of a plurality of overlapping, resin-bonded composite plies arranged in a plurality of opposed helices about a centerline of the composite liner tube, the opposed helices intersecting at predetermined axial and radial locations on an outer surface of the composite liner tube to form nodes extending radially outwardly from the outer surface to form standoffs therefrom, the standoffs capable of centralizing the well flow conductor within an interior of a casing having a larger radius than that of the well flow conductor.

Although the present invention and its advantages have been described in detail, those skilled in the art should understand that they can make various changes, substitutions and alterations herein without departing from the spirit and scope of the invention in its broadest form.

What is claimed is:

1. A well flow conductor, comprising:

a composite liner tube composed of a plurality of overlapping, resin-bonded composite plies and adapted to conduct a fluid flow therethrough; and a composite outer structure surrounding said composite liner tube and composed of a plurality of overlapping, resin-bonded composite plies arranged in a plurality of opposed helices about a centerline of said composite liner tube, said opposed helices intersecting at predetermined axial and radial locations on an outer surface of said composite liner tube to form nodes extending radially outwardly from said outer surface to form standoffs therefrom, said standoffs capable of centralizing said well flow conductor within an interior of a wellbore having a larger radius than that of said well flow conductor.

2. The well flow conductor as recited in claim 1 further comprising a sacrificial layer located on said composite outer structure and composed of a substantially fiber-free resin to isolate said nodes from direct contact with said wellbore as said well flow conductor contacts said wellbore.

3. The well flow conductor as recited in claim 1 further comprising an abrasion-resisting material located on said nodes to resist wearing of said nodes as said well flow conductor contacts said wellbore.

4. The well flow conductor as recited in claim 1 wherein said composite outer structure comprises ceramic beads.

5. The well flow conductor as recited in claim 1 wherein said composite outer structure comprises first and second left-hand helices and first and second right-hand helices.

6. The well flow conductor as recited in claim 1 wherein said helices are oriented at a 45° angle with respect to said centerline of said composite liner tube.

7. The well flow conductor as recited in claim 1 wherein said composite plies are composed of at least one of fiberglass and carbon fiber.

8. The well flow conductor as recited in claim 1 wherein said well flow conductor is adapted to be placed within casing located within the wellbore, an upper portion of said well flow conductor located within a main wellbore and a lower portion of said well flow conductor extending through a window in said casing and located within a lateral wellbore.

9. The well flow conductor as recited in claim 1 wherein said well flow conductor is adapted to be cemented within said wellbore, said composite outer structure generating turbulence in cement flowing about said well flow conductor and providing a complex outer surface for enhanced bonding with said cement.

10. The well flow conductor as recited in claim 1 wherein said well flow conductor has a diameter of 8.25".

11. A method of manufacturing a well flow conductor, comprising the steps of:

overlapping a plurality of resin-bonded composite plies to form a composite liner tube, said composite liner tube adapted to conduct a fluid flow therethrough; and surrounding said composite liner tube with a composite outer structure, said composite outer structure composed of a plurality of overlapping, resin-bonded composite plies arranged in a plurality of opposed helices about a centerline of said composite liner tube, said opposed helices intersecting at predetermined axial and radial locations on an outer surface of said composite liner tube to form nodes extending radially outwardly from said outer surface to form standoffs therefrom, said standoffs capable of centralizing said well flow conductor within an interior of a wellbore having a larger radius than that of said well flow conductor.

12. The method as recited in claim 11 further comprising the step of depositing a sacrificial layer on said composite outer structure and composed of a substantially fiber-free resin to isolate said nodes from direct contact with said wellbore as said well flow conductor contacts said wellbore.

13. The method as recited in claim 11 further comprising the step of depositing an abrasion-resisting material on said nodes to resist wearing of said nodes as said well flow conductor contacts said wellbore.

14. The method as recited in claim 11 wherein said composite outer structure comprises ceramic beads.

15. The method as recited in claim 11 wherein said step of surrounding comprises the step of providing first and second left-hand helices and first and second right-hand helices.

16. The method as recited in claim 11 wherein said step of surrounding comprises the step of providing helices oriented at a 45° angle with respect to said centerline of said composite liner tube.

17. The method as recited in claim 11 wherein said composite plies are composed of at least one of fiberglass and carbon fiber.

18. The method as recited in claim 11 wherein said well flow conductor is adapted to be placed within casing located within the wellbore, an upper portion of said well flow conductor located within a main wellbore and a lower portion of said well flow conductor extending through a window in said casing and located within a lateral wellbore.

19. The method as recited in claim 11 wherein said well flow conductor is adapted to be cemented within said wellbore, said composite outer structure generating turbulence in cement flowing about said well flow conductor and providing a complex outer surface for enhanced bonding with said cement.

20. The method as recited in claim 11 wherein said well flow conductor has a diameter of 8.25".

21. A well flow conductor, comprising:

a composite liner tube composed of a plurality of overlapping, resin-bonded composite plies and adapted to conduct a fluid flow therethrough;

a composite outer structure surrounding said composite liner tube and composed of a plurality of overlapping, resin-bonded composite plies arranged in a plurality of opposed helices about a centerline of said composite liner tube, said opposed helices intersecting at predetermined axial and radial locations on an outer surface of said composite liner tube to form nodes extending radially outwardly from said outer surface to form standoffs therefrom, said standoffs capable of centralizing said well flow conductor within an interior of a wellbore having a larger radius than that of said well flow conductor;

an abrasion-resisting material located on said nodes to resist wearing of said nodes as said well flow conductor contacts said wellbore; and a sacrificial layer located on said composite outer structure and composed of a substantially fiber-free resin to isolate said nodes from direct contact with said wellbore as said well flow conductor contacts said wellbore.

* * * * *